United States Patent
Xue et al.

(10) Patent No.: US 10,634,477 B2
(45) Date of Patent: Apr. 28, 2020

(54) COMPREHENSIVE DETECTION TOOL FOR STEERING KNUCKLE

(71) Applicant: CITIC DICASTAL CO., LTD

(72) Inventors: Bowen Xue, Hebei (CN); Jia Liu, Hebei (CN); Qi Cang, Hebei (CN); Ruisong Tong, Hebei (CN); Jiandong Guo, Hebei (CN)

(73) Assignee: CITIC DICASTAL CO., LTD., Qinhuangdao (CN)

( * ) Notice: Subject to any disclaimer, the term of this patent is extended or adjusted under 35 U.S.C. 154(b) by 203 days.

(21) Appl. No.: 16/024,424

(22) Filed: Jun. 29, 2018

(65) Prior Publication Data
US 2019/0195609 A1 Jun. 27, 2019

(30) Foreign Application Priority Data
Dec. 22, 2017 (CN) .......................... 2017 1 14014889

(51) Int. Cl.
G01B 5/00 (2006.01)
G01B 5/14 (2006.01)
G01B 5/18 (2006.01)

(52) U.S. Cl.
CPC ............. *G01B 5/0025* (2013.01); *G01B 5/14* (2013.01); *G01B 5/18* (2013.01)

(58) Field of Classification Search
CPC ........ G01B 5/0025; G01B 5/061; G01B 3/22; G01B 3/28; G01B 5/14; G01B 5/18; G01B 11/002; G01B 3/12; G01B 3/26; G01B 3/48

USPC ............................................................. 33/600
See application file for complete search history.

(56) References Cited

U.S. PATENT DOCUMENTS

| | | | | |
|---|---|---|---|---|
| 3,218,032 A | * | 11/1965 | Castoe | B25B 27/0035 254/126 |
| 3,416,216 A | * | 12/1968 | Castoe | B25B 27/062 29/261 |
| 4,338,027 A | * | 7/1982 | Eck | G01B 11/26 33/203.12 |
| 2019/0195609 A1 | * | 6/2019 | Xue | G01B 5/0025 |

FOREIGN PATENT DOCUMENTS

| CN | 201548160 U | 8/2010 |
|---|---|---|
| CN | 201909601 | 7/2011 |
| CN | 202101615 | 1/2012 |
| CN | 103017627 A | 4/2013 |
| CN | 202885738 | 4/2013 |
| CN | 204388764 U | 6/2015 |
| CN | 204630510 | 9/2015 |

(Continued)

*Primary Examiner* — Yaritza Guadalupe-McCall
(74) *Attorney, Agent, or Firm* — IPro, PLLC; Qian Gu

(57) ABSTRACT

A comprehensive detection tool for a steering knuckle includes a base, a detection pin, a sliding sleeve, a first jack screw, a positioning pin, a guide sleeve and a spring. When the comprehensive detection tool is used, under the action of the spring, the conical portion of the positioning pin contacts a reference hole B of a detected element; and the bottom surface of the base is closely clung to a reference surface A of the detected element; the threaded section of the detection pin is inserted into a left hole on the base, and then a handle is rotated to allow the threaded section to mate with the threads of the detected element.

1 Claim, 3 Drawing Sheets

(56) References Cited

FOREIGN PATENT DOCUMENTS

| | | |
|---|---|---|
| CN | 205664741 U | 10/2016 |
| CN | 206496719 | 9/2017 |
| CN | 207963681 | 10/2018 |

* cited by examiner

COMPREHENSIVE DETECTION TOOL FOR STEERING KNUCKLE

CROSS REFERENCE TO RELATED APPLICATION

This application claims priority to Chinese Patent Application No. 201711401488.9, entitled COMPREHENSIVE DETECTION TOOL FOR STEERING KNUCKLE and filed on Dec. 22, 2017, which is incorporated herein by reference in its entirety and for all purposes.

FIELD OF THE INVENTION

The present invention relates to a detection tool, in particular to a comprehensive detection tool for a steering knuckle.

BACKGROUND OF THE INVENTION

The automobile steering knuckle is a very important part in an automobile, and its machining process is very complicated. Different holes in the steering knuckle are assembled with different parts, so the position of each hole is very important. The positions of mounting holes for sensors and threaded holes for fixing the sensors on steering knuckles of different structural types are very important detected parameters, which directly affects whether the sensors can be assembled normally. At the same time, the requirement for the depths of the threaded holes is also very high. Thus, a detection tool that can detect the position of a threaded hole relative to an unthreaded hole and the depth of the threaded hole is needed.

SUMMARY OF THE INVENTION

The aim of the present invention is to provide a comprehensive detection tool for a steering knuckle, which not only can be used for detecting the position of a detected threaded hole but also can be used for detecting whether the depth of the detected threaded hole meets the requirement.

In order to fulfill the above aim, the technical solution of the present invention includes a detection tool for a steering knuckle, comprising a base, a detection pin, a sliding sleeve, a jack screw I, a positioning pin, a guide sleeve, a spring, a jack screw II and the like, wherein a detection section I of the detection pin is matched with a left hole on the base; an inner hole of the sliding sleeve is matched with a detection section II of the detection pin; the jack screw I is installed on the sliding sleeve, with the top of the jack screw I being matched with a sliding chute in the detection section II of the detection pin; the guide sleeve is fixed in the right hole on the base; the positioning pin is fitted into an inner hole of the guide sleeve with a fit clearance of 0.005 mm; the spring is installed inside the guide sleeve and is placed at the top of the positioning pin; and the jack screw II is installed on the guide sleeve, with the top of the jack screw II being matched with an open slot in the positioning pin.

The detection pin comprises a threaded section, an unthreaded column section I, a detection section I, an unthreaded column section II, a detection section II and a handle; wherein the upper end of the threaded section is connected with the lower end of the unthreaded column section; the lower end of the detection section I is connected with the upper end of the unthreaded column section; the lower end of the unthreaded column section II is connected with the upper end of the detection section I; the lower end of the detection section II is connected with the upper end of the unthreaded column section II; and the handle is connected with the upper end of the detection section II.

The coaxiality error between the threaded section and the detection section I is less than 0.005 mm; the diameter of the threaded section is smaller than that of the detection section I; the edge of the upper end face of the detection section II is kept sharp; the edge of the inner hole of the sliding sleeve is kept sharp; and the upper end of the positioning pin is cylindrical and the lower end thereof is conical.

In the working process, under the action of the spring, the conical portion of the lower end of the positioning pin is in uniform contact with the upper portion of a reference hole B of a detected element; the bottom surface of the base is closely clung to a reference surface A of the detected element; the threaded section of the detection pin is inserted into a left hole on the base, and then the handle is rotated to allow the threaded section to mate with the threads of the detected element; if the threaded section of the detection pin can be completely screwed into the detected threaded hole, it indicates that the position of the detected threaded hole is qualified, otherwise, the position is unqualified; the bottom surface of the sliding sleeve is closely clung to the top surface of the base to observe whether the edge of the upper end face of the detection section II of the detection pin is lower than the upper edge of the inner hole of the sliding sleeve, if so, it indicates that the depth of the detected threaded hole conforms to the minimum depth H by the drawing, otherwise, the depth is unqualified.

The comprehensive detection tool for the steering knuckle in use not only can detect the position of a detected threaded hole but also can detect whether the depth of the detected threaded hole meets the requirement.

Figure 1:
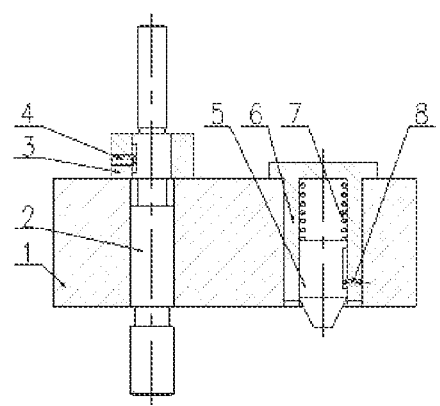
FIG. 1 is a front elevational view of a comprehensive detection tool for a steering knuckle according to the present invention.

In the drawings, 1—base, 2—detection pin, 3—sliding sleeve, 4—jack screw I, 5—positioning pin, 6—guide sleeve, 7—spring, 8—jack screw II, 21—threaded section, 22—unthreaded column section I, 23—detection section I, 24—unthreaded column section II, 25—detection section II, 26—handle.

DETAILED DESCRIPTION OF THE PREFERRED EMBODIMENTS

The details and working conditions of the specific device according to the present invention will be described below in combination with the drawings.

Figure 2:
FIG. 2 is a front elevational view of a detection pin of the comprehensive detection tool for the steering knuckle according to the present invention.
Figure 3:
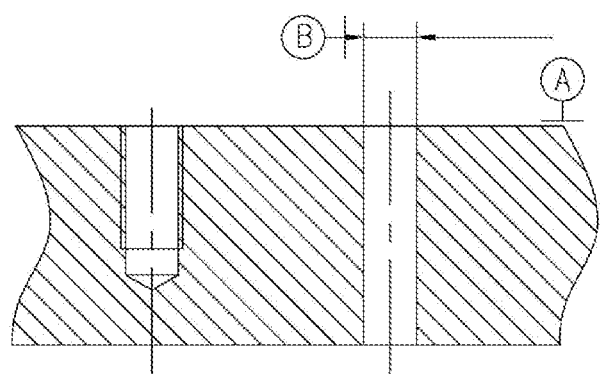
FIG. 3 is a partial front elevational view of a workpiece detected by the comprehensive detection tool for the steering knuckle according to the present invention.

As shown in FIGS. 1-3, the comprehensive detection tool for steering knuckle comprises a base 1, a detection pin 2, a sliding sleeve 3, a jack screw I 4, a positioning pin 5, a guide sleeve 6, a spring 7, a jack screw II 8 and the like, wherein a detection section I 23 of the detection pin 2 is matched with a left hole on the base 1; an inner hole of the sliding sleeve 3 is matched with a detection section II 25 of the detection pin 2; the jack screw I 4 is installed on the sliding sleeve 3, with the top of the jack screw I 4 being matched with a sliding chute in the detection section II 25 of the detection pin 2; the guide sleeve 6 is fixed in the right hole on the base 1; the positioning pin 5 is fitted into an inner hole of the guide sleeve 6 with a fit clearance of 0.005 mm; the spring 7 is installed inside the guide sleeve 6 and is placed at the top of the positioning pin 5; and the jack screw II 8 is installed on the guide sleeve 6, with the top of the jack screw II 8 being matched with an open slot in the positioning pin 5.

The detection pin 2 comprises a threaded section 21, an unthreaded column section I 22, a detection section I 23, an unthreaded column section II 24, a detection section II 25 and a handle 26; wherein the upper end of the threaded section 21 is connected with the lower end of the unthreaded column section 22; the lower end of the detection section I 23 is connected with the upper end of the unthreaded column section 22; the lower end of the unthreaded column section II 24 is connected with the upper end of the detection section I 23; the lower end of the detection section II 25 is connected with the upper end of the unthreaded column section II 24; and the handle 26 is connected with the upper end of the detection section II 25.

The coaxiality error between the threaded section 21 and the detection section I 23 is less than 0.005; the diameter of the threaded section 21 is smaller than that of the detection section I 23; the edge of the upper end face of the detection section II 25 is kept sharp; the edge of the inner hole of the sliding sleeve 3 is kept sharp; and the upper end of the positioning pin 5 is cylindrical and the lower end thereof is conical.

In the working process, under the action of the spring 7, the conical portion of the lower end of the positioning pin 5 is in uniform contact with the upper portion of a reference hole B of a detected element; the bottom surface of the base 1 is closely clung to a reference surface A of the detected element; the threaded section 21 of the detection pin 2 is inserted into the left hole on the base 1, and then the handle 26 is rotated to allow the threaded section 21 to mate with the threads of the detected element; if the threaded section 21 of the detection pin 2 can be completely screwed into the detected threaded hole, it indicates that the position of the detected threaded hole is qualified, otherwise, the position is unqualified; the bottom surface of the sliding sleeve 3 is closely clung to the top surface of the base 1 to observe whether the edge of the upper end face of the detection section II 25 of the detection pin 2 is lower than the upper edge of the inner hole of the sliding sleeve 3, if so, it indicates that the depth of the detected threaded hole conforms to the minimum depth H required by the drawing, otherwise, the depth is unqualified.

The invention claimed is:

1. A comprehensive detection tool for a steering knuckle, comprising a base, a detection pin, a sliding sleeve, a first jack screw, a positioning pin, a guide sleeve, a spring and a second jack screw, wherein a first detection section of the detection pin is matched with a left hole on the base; an inner hole of the sliding sleeve is matched with a second detection section of the detection pin;

the first jack screw is installed on the sliding sleeve, with a top of the first jack screw being matched with a sliding chute in the second detection section of the detection pin; the guide sleeve is fixed in a right hole on the base; the positioning pin is fitted into an inner hole of the guide sleeve with a fit clearance of 0.005 mm; the spring is installed inside the guide sleeve and is placed at a top of the positioning pin; and the second jack screw is installed on the guide sleeve, with a top of the second jack screw being matched with an open slot in the positioning pin;

the detection pin comprises a threaded section, a first unthreaded column section, the first detection section, a second unthreaded column section, the second detection section and a handle; wherein an upper end of the threaded section is connected with a lower end of the first unthreaded column section; a lower end of the first detection section is connected with the an upper end of the first unthreaded column section; a lower end of the second unthreaded column section is connected with an upper end of the first detection section; a lower end of the second detection section is connected with an upper end of the second unthreaded column section; and the handle is connected with an upper end of the second detection section; and a coaxiality error between the threaded section and the first detection section is less than 0.005; a diameter of the threaded section is smaller than that of the first detection section; an edge of an upper end face of the second detection section is kept sharp; an edge of the inner hole of the sliding sleeve is kept sharp; and an upper end of the positioning pin is cylindrical and a lower end thereof is conical.

\* \* \* \* \*